United States Patent
Maesaka et al.

Patent Number: 5,259,193
Date of Patent: Nov. 9, 1993

[54] HYDRAULIC TRANSMISSION SYSTEM

[75] Inventors: Kiyotomi Maesaka; Makiro Ishimoto; Tomoaki Ishikawa, all of Saitama, Japan

[73] Assignee: Honda Giken Kogyo Kabushiki Kaisha, Tokyo, Japan

[21] Appl. No.: 724,847

[22] Filed: Jul. 2, 1991

Related U.S. Application Data

[63] Continuation-in-part of Ser. No. 559,896, Jul. 30, 1990, Pat. No. 5,094,078.

[30] Foreign Application Priority Data

Jul. 2, 1990 [JP] Japan ................... 2-174896

[51] Int. Cl.$^5$ .................. F16D 31/02; F16D 39/00
[52] U.S. Cl. ............................... 60/453; 60/487
[58] Field of Search .............. 60/487, 488, 489, 490, 60/491, 453, 454

[56] References Cited

U.S. PATENT DOCUMENTS

| | | | |
|---|---|---|---|
| 3,465,520 | 9/1969 | Hann | 60/443 |
| 3,973,400 | 8/1976 | Petersen | 60/487 X |
| 4,005,577 | 2/1977 | Haumaier | 60/487 X |
| 4,132,072 | 1/1979 | Schlinke | 60/487 X |
| 4,215,546 | 8/1980 | Hager et al. | 60/487 X |
| 4,274,505 | 6/1981 | Maust | 60/487 X |
| 4,803,969 | 2/1989 | Hiereth et al. | 60/487 X |
| 4,856,264 | 8/1989 | Nishimura et al. | 128/372 |
| 4,974,472 | 12/1990 | Nishimura et al. | 74/718 |
| 4,986,073 | 1/1991 | Okada | 60/487 X |
| 5,094,078 | 5/1992 | Nishimura et al. | 60/487 |

FOREIGN PATENT DOCUMENTS

| | | |
|---|---|---|
| 1169333 | 6/1984 | Canada. |
| 1425817 | 10/1969 | Fed. Rep. of Germany. |
| 1924010 | 9/1976 | Fed. Rep. of Germany. |
| 2643180 | 4/1977 | Fed. Rep. of Germany. |
| 0089416 | 9/1983 | Fed. Rep. of Germany. |
| 3516747 | 11/1985 | Fed. Rep. of Germany. |

Primary Examiner—Edward K. Look
Assistant Examiner—Hoang Nguyen
Attorney, Agent, or Firm—Irving M. Weiner; Joseph P. Carrier; Pamela S. Burt

[57] ABSTRACT

A hydraulic transmission system comprising a housing having at least an oil tank containing oil, an oil pump mounted in the housing and having an inlet port and an outlet port, an oil motor mounted in the housing and having an inlet port and an outlet port, a high-pressure oil passage defined in the housing and interconnecting the outlet port of the oil pump and the inlet port of the oil motor, a low-pressure oil passage defined in the housing and interconnecting the outlet port of the oil motor and the inlet port of the oil pump, an oil supply passage defined in the housing and interconnecting the low-pressure oil passage and the oil tank, for supplying oil pumped from the oil tank by the oil pump for circulation between the oil pump and the oil motor through the high-pressure oil passage and the low-pressure oil passage, and a return oil passage defined in the housing and connecting at least a portion of the low-pressure oil passage to the oil tank, for removing air trapped in the oil circulating between the oil pump and the oil motor.

15 Claims, 6 Drawing Sheets

HYDRAULIC TRANSMISSION SYSTEM

This application is a continuation-in-part application of prior U.S. application Ser. No. 07/559,896, filed Jul. 30, 1990, now U.S. Pat. No. 5,094,078.

BACKGROUND OF THE INVENTION

Field of the Invention

The present invention relates to a hydraulic transmission system comprising an oil motor and an oil pump for hydraulically actuating the oil motor, and more particularly to a hydraulic transmission system which has a means for removing air trapped in oil circulating in the hydraulic transmission system.

Description of the Relevant Art

One known hydraulic transmission system is disclosed in U.S. Pat. No. 4,856,264, for example. The disclosed hydraulic transmission system is disadvantageous in that when an engine coupled to the hydraulic transmission system is started, air tends to be trapped in oil that is fed into the hydraulic transmission system.

SUMMARY OF THE INVENTION

In view of the foregoing shortcoming of the conventional hydraulic transmission system, it is an object of the present invention to provide a hydraulic transmission system which can quickly remove trapped air from a hydraulic circuit at all times even while the hydraulic transmission system is in operation.

According to the present invention, there is provided a hydraulic transmission system comprising a housing having at least an oil tank containing oil, an oil pump mounted in the housing and having an inlet port and an outlet port, an oil motor mounted in the housing and having an inlet port and an outlet port, a high-pressure oil passage defined in the housing and interconnecting the outlet port of the oil pump and the inlet port of the oil motor, a low-pressure oil passage defined in the housing and interconnecting the outlet port of the oil motor and the inlet port of the oil pump, an oil supply passage defined in the housing and interconnecting the low-pressure oil passage and the oil tank, for supplying oil pumped from the oil tank by the oil pump for circulation between the oil pump and the oil motor through the high-pressure oil passage and the low-pressure oil passage, and a return oil passage defined in the housing and connecting at least a portion of the low-pressure oil passage to the oil tank, for removing air trapped in the oil circulating between the oil pump and the oil motor.

The return oil passage connects a portion of the low-pressure oil passage which extends between the outlet port of the oil motor and the oil supply passage, to the oil tank. More preferably, the low-pressure oil passage has a linear portion extending from the outlet port of the oil motor, a bent portion connected to the linear portion, and a portion extending from the bent portion and connected to the inlet port of the oil pump, and the return oil passage extends from the linear portion in line therewith and is connected to the oil tank.

The above and further objects, details and advantages of the present invention will become apparent from the following detailed description of preferred embodiments thereof, when read in conjunction with the accompanying drawings.

DETAILED DESCRIPTION OF THE PREFERRED EMBODIMENTS

Figure 1:
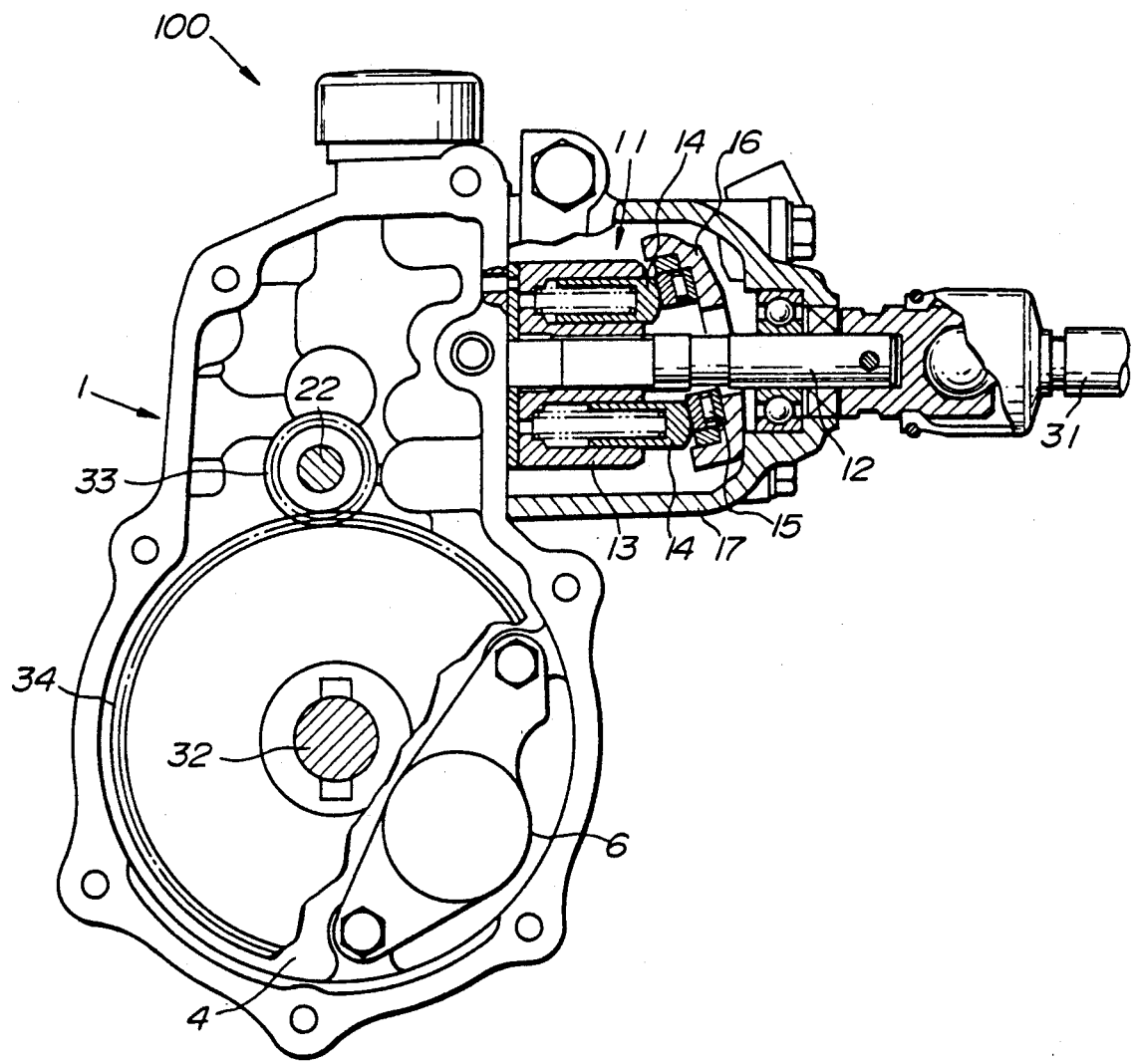
FIG. 1 is a front elevational view, partly in cross section, of a hydraulic transmission system according to the present invention, the view showing an oil pump.
Figure 2:
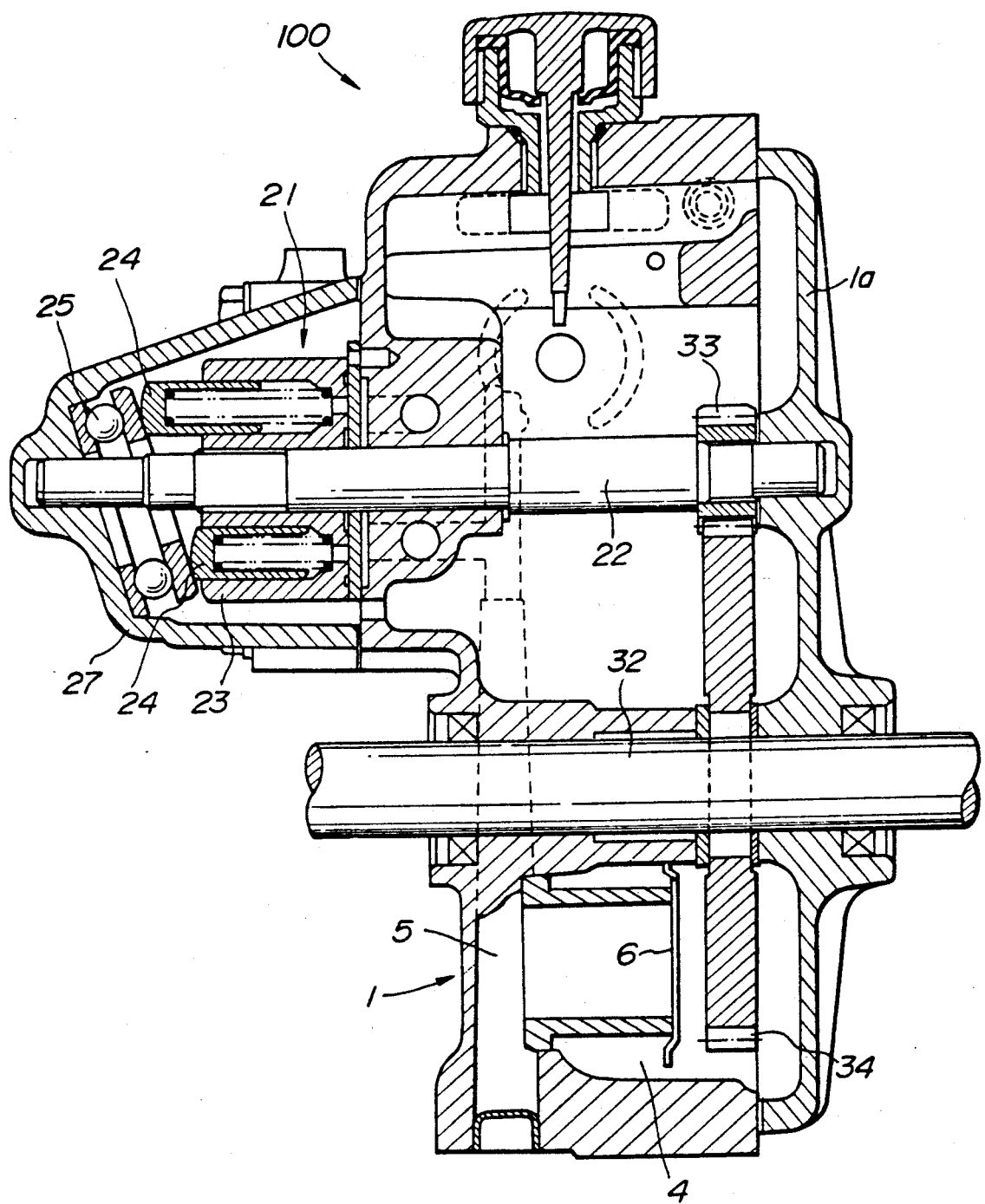
FIG. 2 is a vertical cross-sectional view of the hydraulic transmission system, the view showing an oil motor.
Figure 3:
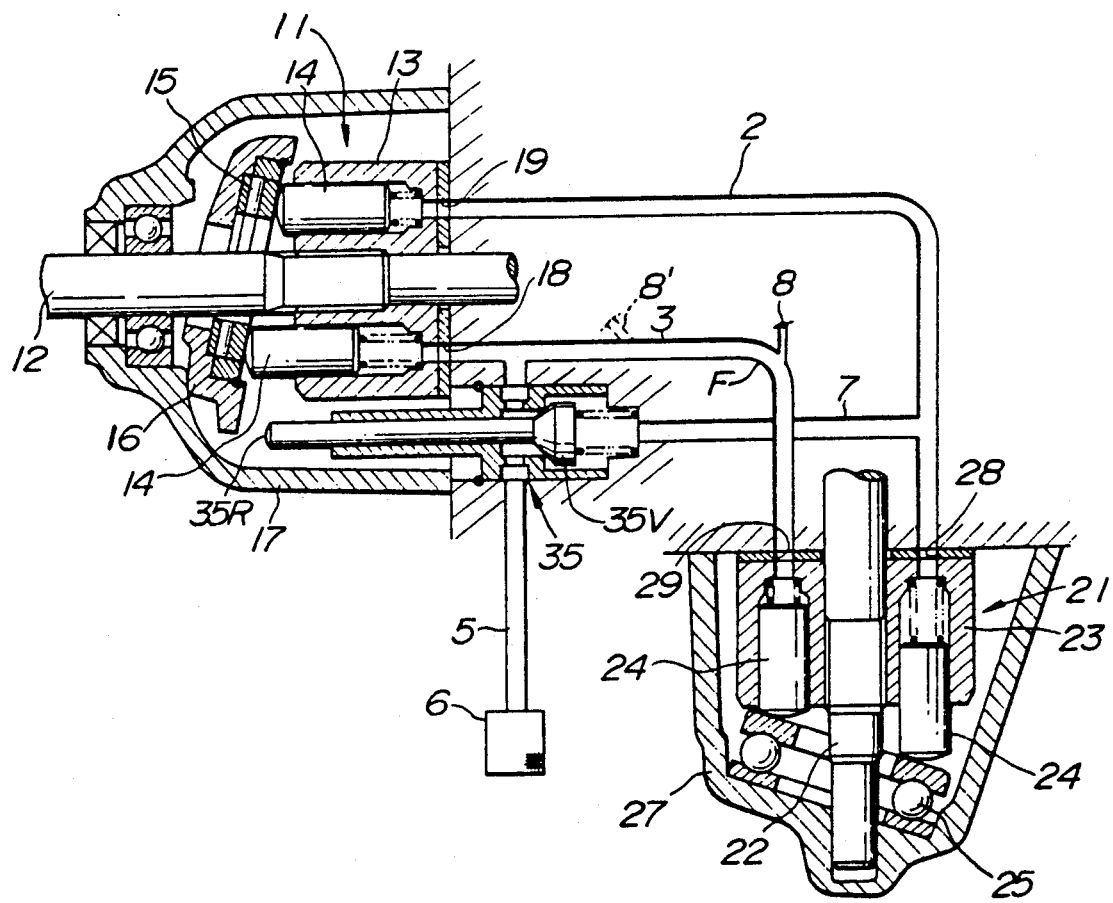
FIG. 3 is a horizontal cross-sectional view showing an oil passage arrangement between the oil pump and the oil motor in the hydraulic transmission system.

FIGS. 1 through 3 show a hydraulic transmission system 100 according to the present invention. The hydraulic transmission system 100 generally comprises a housing 1, an oil pump 11, and an oil motor 21. The oil pump and the oil motor 21 are mounted in the housing 1 with their axes directed perpendicularly to each other.

As shown in FIG. 1, the oil pump 11 comprises a pump shaft 12 rotatably mounted in a pump case 17, a cylinder assembly 13 splined to the pump shaft 12 and having a circular array of cylindrical bores, a plurality of pistons 14 slidably fitted in the respective cylindrical bores in the cylinder assembly 13, and a swash plate 16 slidably held against the tip ends of the pistons 14 through a thrust bearing 15. As shown in FIG. 3, the oil pump 11 has an inlet port 18 and an outlet port 19. To the pump shaft 12, there is connected an input shaft 31 that is coupled to an engine (not shown).

As shown in FIG. 2, the oil motor 21 comprises a motor shaft 22 rotatably mounted in a motor case 27, a cylinder assembly 23 splined to the motor shaft 22 and having a circular array of cylindrical bores, a plurality of pistons 24 slidably fitted in the respective cylindrical bores in the cylinder assembly 23, and a swash-plate bearing 25 slidably held against the tip ends of the pistons 24. As shown in FIG. 3, the oil motor 21 has an inlet port 28 and an outlet port 29. The motor shaft 22 extends transversely in the housing 1 and is rotatably supported at one end by a cover 1a attached to one side of the housing 1.

As shown in FIGS. 1 and 2, the hydraulic transmission system 100 has an output shaft 32 extending parallel to the motor shaft 22 and rotatably supported by the housing 1 and the cover 1a. The output shaft 32 is operatively coupled to the motor shaft 22 through speed-reducer gears 33, 34.

As shown in FIG. 3, the housing 1 defines, in its wall, a high-pressure oil passage 2 interconnecting the outlet port 19 of the oil pump 11 and the inlet port 28 of the oil motor 21, a low-pressure oil passage 3 interconnecting the outlet port 29 of the oil motor 21 and the inlet port 18 of the oil pump 11, and an oil supply passage 5 interconnecting the low-pressure oil passage 3 and an oil tank 4 in the bottom of the housing 1. As shown in FIG. 2, an oil filter 6 is attached over an open end of the oil supply passage 5 which opens into the oil tank 4.

The high-pressure oil passage 2 and the oil supply passage 5 are interconnected by a bypass oil passage 7 which is also defined in the wall of the housing 1. The bypass oil passage 7 has a neutral-position directional control valve mechanism 35 which is actuatable by the swash plate 16.

Figure 4:
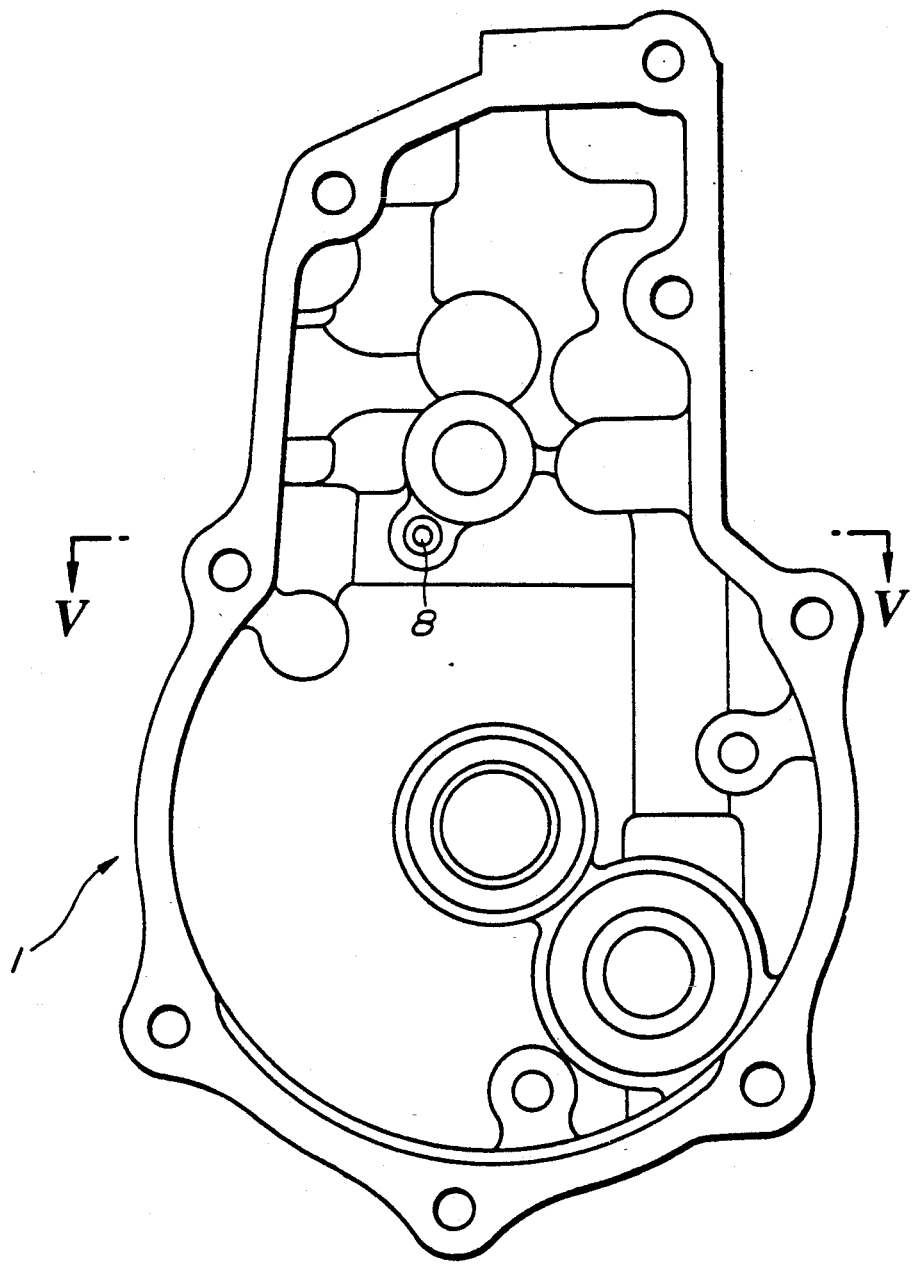
FIG. 4 is a front elevational view of a housing of the hydraulic transmission system, with a cover removed to show a return oil passage.
Figure 5:
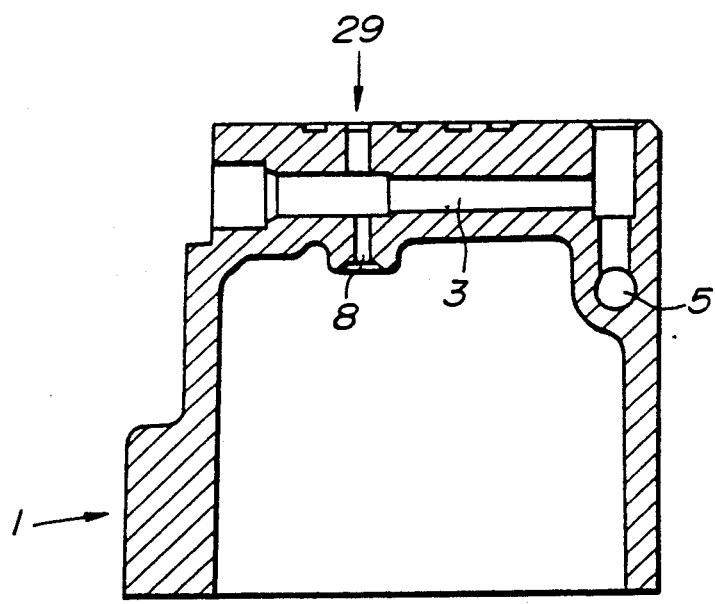
FIG. 5 is a cross-sectional view taken along line V—V of FIG. 4.
Figure 6:
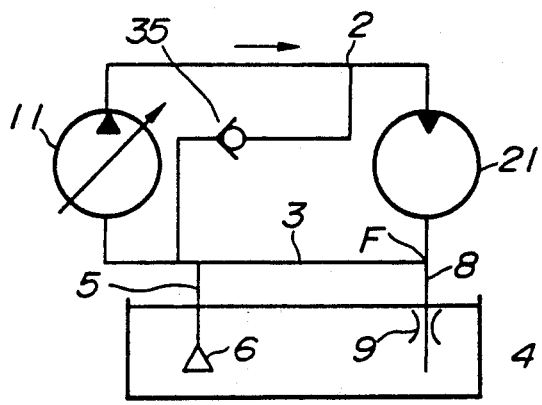
FIG. 6 is a circuit diagram of a hydraulic pressure circuit according to a first embodiment of the present invention, for the hydraulic transmission system.

As illustrated in FIG. 3, the low-pressure oil passage 3 extends linearly in the vicinity of the outlet port 29 of the oil motor 21 or by a certain distance from the outlet port 29, is then bent at a portion F through about 90 degrees, and extends to and is connected to the inlet port 18 of the oil pump 11. The bent portion F of the low-pressure oil passage 3 has a return oil passage 8 which communicates with the oil tank 4. As shown in FIGS. 3 through 5, the return oil passage 8 extends substantially in line with the linear portion of the low-pressure oil passage 3 which extends from the outlet port 29. The return oil passage 8 is in the form of a small hole having a cross-sectional area smaller than that of the low-pressure oil passage 3. As shown in FIG. 6, the return oil passage 8 serves as a restriction or choke 9.

When the output power from the engine is to be transmitted from the input shaft 31 to the output shaft 32 and the neutral-position directional control valve mechanism 35 closes the bypass oil passage 7, oil is circulated between the oil pump 11 and the oil motor 21 to actuate the oil motor 21. More specifically, when the pump shaft 12 rotates, the pistons 14 reciprocally move to supply oil under pressure to the cylinder assembly 23 of the oil motor 21 through the high-pressure oil passage 2, thereby reciprocally moving the pistons 24. The oil is then returned from the cylinder assembly 23 through the low-pressure oil passage 3 back to the oil pump 11. The motor shaft 22 rotates upon such circulation of the oil between the oil pump 11 and the oil motor 21. The rotative power is transmitted from the motor shaft 22 through the speed-reducer gears 33, 34 to the output shaft 32.

When the swash plate 16 is angularly displaced into a neutral position (e.g., when the swash plate 16 which is inclined at an angle to the pump shaft 12 is angularly displaced so as to be perpendicular to the pump shaft 12), the swash plate 16 engages and pushes a projecting end 35R of the rod of the neutral-position directional control valve mechanism 35, moving a valve body 35V to open the by-pass oil passage 7. Therefore, the high-pressure oil passage 2 communicates with the oil supply passage 5. The transmission of rotative power to the motor shaft 22 is now stopped, making the motor shaft 22 and the output shaft 32 freely rotatable.

Removal of trapped air from the circulating oil in the hydraulic transmission system will now be described below.

FIG. 6 shows a hydraulic pressure circuit according to a first embodiment of the present invention, for the hydraulic transmission system. As shown in FIG. 6, when the engine starts, part of oil with trapped air is smoothly discharged through the return oil passage 8 linearly extending from the outlet port 29 of the oil motor 21. More specifically, since the return oil passage 8 is smaller in cross-sectional area than the low-pressure oil passage 3, providing the restriction or choke 9, part of oil with trapped air flows at increased speed and is quickly discharged from the return oil passage 8, preventing a negative pressure from being developed in the portion of the low-pressure oil passage 3 which extends past the return oil passage 8. Inasmuch as the oil circulating in the hydraulic pressure circuit flows through the right-angularly bent portion F of the low-pressure oil passage 3, but the return oil passage 8 opening into the bent portion F is directed in line with the linear portion of the low-pressure oil passage 3 extending from the outlet port 29, oil with trapped air is smoothly discharged from the low-pressure oil passage 3.

At least part of the oil discharged by the oil motor 21 returns from the low-pressure oil passage 3 to the oil tank 4, through the return oil passage 8 and the oil in the oil tank 4 is supplied again from the oil supply passage 5 to the low-pressure oil passage 3 through the oil filter 6. While the oil is circulating in this manner, trapped air is thoroughly removed from the oil by the oil filter 6. This process is repeated to remove trapped air quickly and smoothly from the hydraulic pressure circuit.

Figure 7:
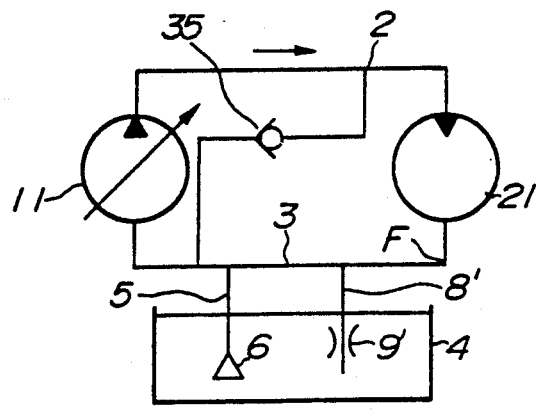
FIG. 7 is a circuit diagram of a hydraulic pressure circuit according to a second embodiment of the present invention, for the hydraulic transmission system.

FIG. 7 shows a hydraulic pressure circuit according to a second embodiment of the present invention, for the hydraulic transmission system. In FIG. 7, a return oil passage 8' is positioned intermediate the bent portion F and the oil supply passage 5, but more closely to the bent portion F than to the oil supply passage 5 (see also FIG. 3). The diameter (i.e., the cross-sectional area) of the return oil passage 8' may be slightly increased for quick removal of trapped air from the hydraulic pressure circuit. The return oil passage 8' should preferably be inclined toward the oil supply passage 5 so that oil with trapped air flowing through the low-pressure oil passage 3 finds it easy to enter the return oil passage 8'.

Figure 8:
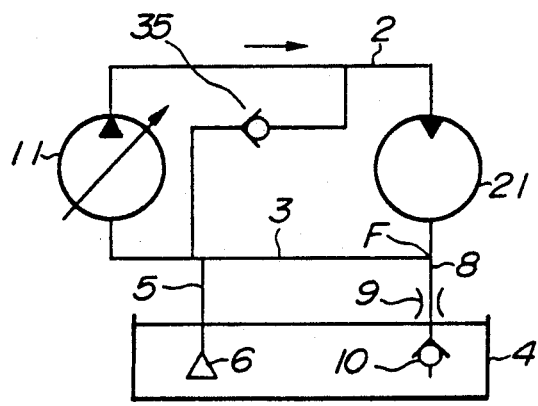
FIG. 8 is a circuit diagram of a hydraulic pressure circuit according to a third embodiment of the present invention, for the hydraulic transmission system.
Figure 9:
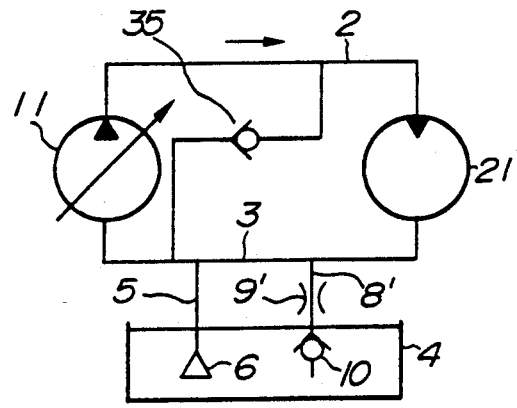
FIG. 9 is a circuit diagram of a hydraulic pressure circuit according to a fourth embodiment of the present invention, for the hydraulic transmission system.

FIGS. 8 and 9 show hydraulic pressure circuits according to third and fourth embodiments, respectively, of the present invention, for the hydraulic transmission system. The hydraulic pressure circuits shown in FIGS. 8 and 9 differ from those shown in FIGS. 6 and 7 in that each of the return oil passages 8, 8' has a check valve or one-way valve 10 for preventing oil from flowing back from the oil tank 4 into the return oil passages 8, 8'.

Figure 10:
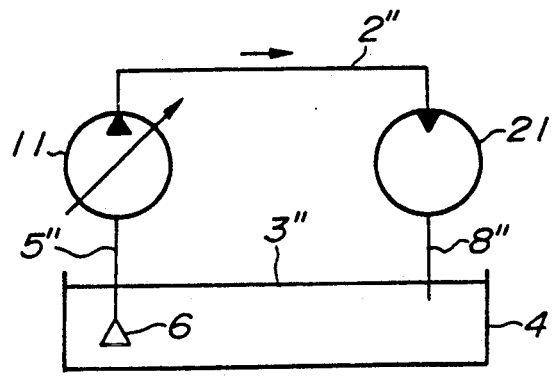
FIG. 10 is a circuit diagram of a hydraulic pressure circuit according to a fifth embodiment of the present invention, for the hydraulic transmission system.

FIG. 10 illustrates a hydraulic pressure circuit according to a fifth embodiment of the present invention, for the hydraulic transmission system. In FIG. 10, the oil discharged from the outlet port 29 of the oil motor 21 is returned in its entirety to the oil tank 4 through a return oil passage 8". The interior of the oil tank 4 thus serves as part of a low-pressure oil passage 3".

With the present invention, as described above, the return oil passage positioned between the outlet port of the oil motor and the oil supply passage, for returning at least part of the circulating oil to the oil tank, allows air trapped in the oil to be quickly removed out of the hydraulic pressure circuit while the hydraulic transmission system is in operation.

Although there have been described what are at present considered to be the preferred embodiments of the invention, it will be understood that the invention may be embodied in other specific forms without departing from the essential characteristics thereof. The present embodiments are therefore to be considered in all respects as illustrative, and not restrictive. The scope of the invention is indicated by the appended claims rather than by the foregoing description.

We claim:

1. A hydraulic transmission system comprising:

a housing having at least an oil tank formed therein containing oil, said oil tank being open to the atmosphere;

an oil pump having an inlet port and an outlet port and disposed in a pump chamber defined in a pump case which is mounted on said housing with the pump chamber being in direct communication with the oil tank so as to directly drain oil leaked from said oil pump into said oil tank;

an oil motor having an inlet and an outlet port and disposed in a motor chamber defined in a motor case which is mounted on said housing with the motor chamber being in direct communication with the oil tank so as to directly drain oil leaked from said oil motor into said oil tank;

a high-pressure oil passage defined in said housing and interconnecting the outlet port of said oil pump and the inlet port of said oil motor;

a low-pressure oil passage defined in said housing and interconnecting the outlet port of said oil motor and the inlet port of said oil pump;

an oil supply passage defined in said housing and interconnecting said low-pressure oil passage and said oil tank, for supplying oil pumped from said oil tank by said oil pump for circulation between said oil pump and said oil motor through said high-pressure oil passage and said low-pressure oil passage;

means for removing air trapped in the oil circulating between said oil pump and said oil motor, said air removing means including a return oil passage defined in said housing and connecting a portion of said low-pressure oil passage to said oil tank for continuously returning a portion of the oil in the low-pressure oil passage to the oil tank when the transmission is normally operating; and said return oil passage being separate from said low-pressure oil passage.

2. A hydraulic transmission system according to claim 1, wherein said low-pressure oil passage has a linear portion extending from the outlet port of said oil motor, a bent portion connected to said linear portion, and a portion extending from said bent portion and connected to the inlet port of said oil pump, said return oil passage extending from said linear portion in line therewith and connected to said oil tank.

3. A hydraulic transmission system according to claim 2, wherein said return oil passage comprises a small-hole diameter passage having a cross-sectional area which is smaller than the cross-sectional area of said low-pressure oil passage, thereby providing a choke.

4. A hydraulic transmission system according to claim 1, wherein said oil supply passage has an oil filter disposed in said oil tank, for removing trapped air from the oil when the oil returned from said return oil passage to said oil tank flows through said oil filter.

5. A hydraulic transmission system according to claim 1, wherein said low-pressure oil passage has a linear portion extending from the outlet port of said oil motor, a bent portion connected to said linear portion, and a portion extending from said bent portion and connected to the inlet portion of said oil pump, and said return oil passage is connected to said portion of said low-pressure oil passage which extends from said bent portion, and is positioned more closely to said oil supply passage than to said bent portion.

6. A hydraulic transmission system according to claim 5, wherein said return oil passage is inclined from said portion of the low-pressure oil passage toward said oil supply passage.

7. A hydraulic transmission system comprising:

a housing having at least one oil tank formed therein containing oil, said oil tank being open to the atmosphere;

an oil pump having an inlet port and an outlet port and disposed in a pump chamber defined in a pump case which is mounted on said housing with the pump chamber being in direct communication with the oil tank so as to directly drain oil leaked from said oil pump into said oil tank;

an oil motor having an inlet port and an outlet port and disposed in a motor chamber defined in a motor case which is mounted on said housing with the motor chamber being in direct communication with the oil tank so as to directly drain oil leaked from the oil motor into said oil tank;

a high-pressure oil passage defined in said housing and interconnecting the outlet port of said oil pump and the inlet port of said oil motor;

a low-pressure oil passage defined in said housing and interconnecting the outlet port of said oil motor and the inlet port of said oil pump;

an oil supply passage defined in said housing and interconnecting said low-pressure oil passage and said oil tank, for supplying oil pumped from said oil tank by said oil pump for circulation between said oil pump and said oil motor through said high-pressure oil passage and said low-pressure oil passage; and means for removing air trapped in the oil circulating between said oil pump and said oil motor, said air removing means including a return oil passage defined in said housing and connecting the outlet port of said oil motor entirely to said oil tank so that said oil tank serves as a part of said low-pressure oil passage, and an oil filter disposed in said oil tank for removing trapped air from the oil when the oil returned from said return oil passage to said oil tank flows through said oil filter.

8. A hydraulic transmission system according to claim 1, further including a one-way valve connected to said return oil passage, for preventing the oil from flowing back from said oil tank into said return oil passage.

9. A hydraulic transmission system comprising:

a housing having at least an oil tank formed therein containing oil, said oil tank being open to the atmosphere;

an oil pump having an inlet port and an outlet port and disposed in a pump chamber defined in a pump case which is mounted on said housing with the pump chamber being in direct communication with the oil tank so as to directly drain oil leaked from said oil pump into said oil tank;

an oil motor having an inlet port and an outlet port and disposed in a motor chamber defined in a motor case which is mounted on said housing with the motor chamber being in direct communication with the oil tank so as to directly drain oil leaked from said oil motor into said oil tank;

a high-pressure oil passage defined in a wall of said housing and interconnecting the outlet port of said oil pump and the inlet port of said oil motor;

a low-pressure oil passage defined in a wall of said housing and interconnecting the outlet port of said oil motor and the inlet port of said oil pump;

an oil supply passage defined in said housing and interconnecting said low-pressure oil passage and said oil tank, for supplying oil pumped from said oil tank by said oil pump for circulation between said oil pump and said oil motor through said high-pressure oil passage and said low-pressure oil passage; and said low-pressure oil passage having a linear portion extending from the outlet port of said oil motor, a substantially right-angularly bent portion connected to said linear portion, and a portion extending from said bent portion and connected to the inlet port of said oil pump, said low-pressure oil passage including a return oil passage extending from said linear portion in line therewith and connected to said oil tank to return oil from the outlet port of said oil motor to said oil tank, said return oil passage having a cross-sectional area smaller than the cross-sectional area of said low-pressure oil passage.

10. A hydraulic transmission system according to claim 9, including means for removing air trapped in the oil circulating between the oil pump and the oil motor, said air removing means comprising said return oil passage.

11. A hydraulic transmission apparatus according to claim 10, wherein said air removing means further comprises an oil filter disposed in said oil tank for removing trapped air from the oil when the oil returned from said return oil passage to said oil tank flows through the oil filter.

12. A hydraulic transmission according to claim 9, wherein said return oil passage continuously returns a portion of the oil in the low-pressure passage of the oil tank when the transmission is normally operating.

13. A hydraulic transmission system according to claim 1, wherein said return oil passage connects a portion of said low-pressure oil passage which extends between the outlet port of said oil motor and said oil supply passage, to said oil tank.

14. A hydraulic transmission system according to claim 1, wherein said return oil passage has a cross-sectional area smaller than the cross-sectional area of said low-pressure oil passage.

15. A hydraulic transmission system according to claim 1, wherein said low-pressure oil passage extends fully from the outlet port of said oil motor to the inlet port of said oil pump.

* * * * *

UNITED STATES PATENT AND TRADEMARK OFFICE
CERTIFICATE OF CORRECTION

PATENT NO. : 5,259,193
DATED : November 9, 1993
INVENTOR(S) : Maesaka et al.

It is certified that error appears in the above-indentified patent and that said Letters Patent is hereby corrected as shown below:

Column 2, line 40, after "pump" insert --11--.

Column 5, line 53 (claim 3, line 3), change "small-hole diameter" to --small-diameter oil--.

Column 6, line 9 (claim 7, line 2), change "one" to --an--.

Signed and Sealed this

Nineteenth Day of April, 1994

Attest:

BRUCE LEHMAN

Attesting Officer     Commissioner of Patents and Trademarks